(12) United States Patent
Hao et al.

(10) Patent No.: US 11,336,101 B2
(45) Date of Patent: *May 17, 2022

(54) ADAPTIVE FAST-CHARGING OF MULTI-PACK BATTERY SYSTEM IN A MOBILE PLATFORM HAVING DUAL CHARGE PORTS

(71) Applicant: GM GLOBAL TECHNOLOGY OPERATIONS LLC, Detroit, MI (US)

(72) Inventors: Lei Hao, Troy, MI (US); Yue-Yun Wang, Troy, MI (US); Suresh Gopalakrishnan, Troy, MI (US); Chandra S. Namuduri, Troy, MI (US); Rashmi Prasad, Troy, MI (US); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 225 days.

This patent is subject to a terminal disclaimer.

(21) Appl. No.: 16/780,308

(22) Filed: Feb. 3, 2020

(65) Prior Publication Data
US 2021/0242691 A1 Aug. 5, 2021

(51) Int. Cl.
| H02J 7/00 | (2006.01) |
| H02J 7/14 | (2006.01) |
| B60L 53/18 | (2019.01) |
| B60W 10/08 | (2006.01) |
| B60L 53/24 | (2019.01) |

(52) U.S. Cl.
CPC ............ *H02J 7/0019* (2013.01); *B60L 53/18* (2019.02); *B60L 53/24* (2019.02); *B60W 10/08* (2013.01); *B60L 2240/423* (2013.01)

(58) Field of Classification Search
USPC ........................................ 320/134, 109, 137
See application file for complete search history.

(56) References Cited

U.S. PATENT DOCUMENTS

| 7,489,048 B2* | 2/2009 | King | H02J 7/345 |
| | | | 307/10.1 |
| 9,024,586 B2* | 5/2015 | Vance | B60L 58/22 |
| | | | 320/122 |
| 10,369,896 B2* | 8/2019 | Namuduri | B60L 53/11 |
| 11,046,202 B2* | 6/2021 | Zappaterra | H02J 7/0024 |

(Continued)

*Primary Examiner* — Alexis B Pacheco
(74) *Attorney, Agent, or Firm* — Quinn IP Law

(57) ABSTRACT

A system for use with a direct current fast-charging (DCFC) station includes a controller and battery system. The battery system includes first and second battery packs, and first, second, and third switches. The switches have ON/OFF conductive states commanded by the controller to connect the battery packs in a parallel-connected (P-connected) or series-connected (S-connected) configuration. An electric powertrain with one or more electric machines is powered via the battery system. First and second charge ports of the system are connectable to the station via a corresponding charging cable. The first charge port receives a low or high charging voltage from the station. The second charge port receives a low charging voltage. When the station can supply the high charging voltage to the first charge port, the controller establishes the S-connected configuration via the switches, and thereafter charges the battery system solely via the first charge port.

20 Claims, 6 Drawing Sheets

(56) References Cited

U.S. PATENT DOCUMENTS

| | | | | |
|---|---|---|---|---|
| 2012/0161698 A1* | 6/2012 | Anderson | ............. | H02J 7/0077 320/109 |
| 2015/0137751 A1* | 5/2015 | King | ....................... | B60L 50/16 320/109 |
| 2016/0079751 A1* | 3/2016 | Ide | ......................... | H02J 7/342 307/52 |
| 2016/0090054 A1* | 3/2016 | Powell | ................... | B60R 16/03 307/9.1 |
| 2016/0129796 A1* | 5/2016 | Tomura | ................ | B60W 10/26 701/22 |
| 2017/0279275 A1* | 9/2017 | Yamamoto | ........ | H02J 7/007182 |
| 2019/0381905 A1* | 12/2019 | Winkler | ................. | B60L 58/12 |
| 2021/0086646 A1* | 3/2021 | Prasad | ................. | H02J 7/0045 |

\* cited by examiner

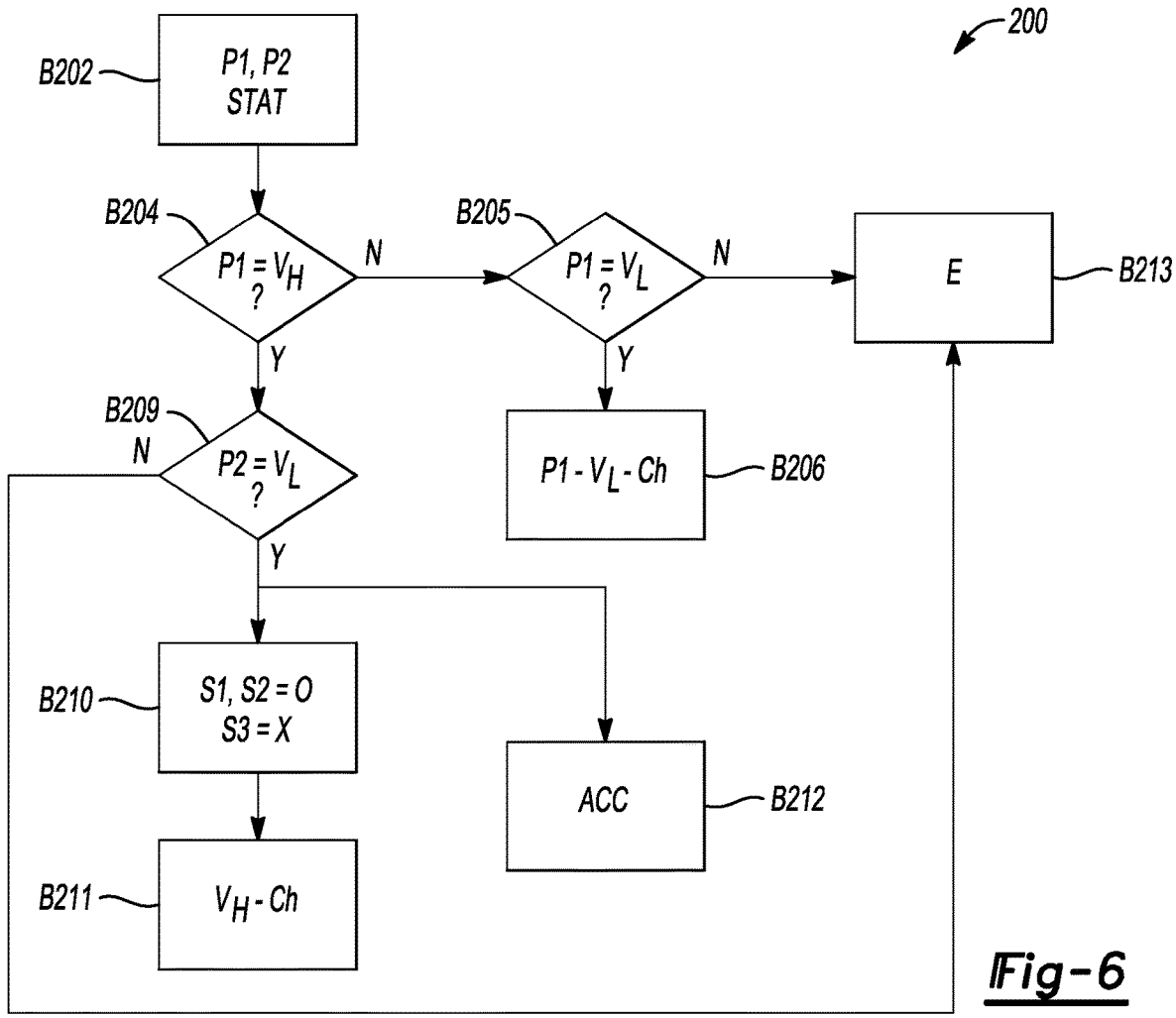

ADAPTIVE FAST-CHARGING OF MULTI-PACK BATTERY SYSTEM IN A MOBILE PLATFORM HAVING DUAL CHARGE PORTS

INTRODUCTION

The present disclosure relates to direct current fast-charging (DCFC) architectures and adaptive charging methodologies for use with motor vehicles and other mobile platforms having dual charge ports. Electric powertrains of the types used to propel battery electric or hybrid electric motor vehicles include one or more rotary electric machines constructed from a wound stator and a magnetic rotor. The stator windings are connected to an alternating current (AC)-side of a power inverter, with a direct current (DC)-side of the same power inverter being connected to positive and negative rails of a DC voltage bus. When the electric machine functions in its capacity as an electric traction motor, control of the ON/OFF conducting states of individual semiconductor switches residing within the power inverter generates an output voltage at a level suitable for energizing the stator windings. Sequential energization of the stator windings generates a rotating magnetic field that ultimately interacts with the rotor's magnetic field to produce useful machine rotation and torque.

The DC voltage bus is electrically connected to an onboard voltage supply. In a high-energy mobile application such as the above-noted battery electric or hybrid electric vehicles, the voltage supply is typically embodied as a high-energy multi-cell battery pack. Voltage capabilities of battery packs commonly used for energizing propulsion functions aboard such vehicles continue to increase in order to satisfy the demand for extended electric driving ranges. Battery charging infrastructure and associated charging methodologies likewise continue to evolve. For example, certain emerging DCFC stations are capable of providing relatively high charging voltages, e.g., 800-1000V or more, while older "legacy" charging stations are generally capable of providing lower charging voltages, for instance 400-500V. As a result, a battery pack and associated power electronics of a mobile platform are limited to a specific maximum charging voltage, which may or may not be available at an encountered DCFC station.

SUMMARY

A dual port charging architecture and accompanying charging method are described herein that together enable a reconfigurable multi-pack battery system to receive maximum charging power during a direct current fast-charging (DCFC) event. Charging power from a DCFC station is provided to one or both charge ports of the mobile platform at a relatively high or low voltage level. As used herein, the terms "high" and "low" are relative terms. In a non-limiting exemplary embodiment, for instance, 800-1000V or more may be considered high voltage, with low voltage being half of the high voltage level or less, e.g., 400-500V. Such voltage levels are representative of charging voltages of current and emerging DCFC stations. However, lower or higher charging voltages may be contemplated within the scope of the disclosure, and therefore nominal 400V and 800V charging voltages are merely illustrative of the present teachings and not limiting.

The battery system used in the present approach has multiple battery packs. The battery system is reconfigurable in the sense that the battery packs may be connected together in a parallel (P-connected) configuration or a series (S-connected) configuration. When connected in series, the battery packs may receive the above-noted high charging voltage. A simplified variation of such a battery system includes two battery packs. The charging voltage in such an embodiment is thus twice the magnitude of the low charging voltage. Additional battery packs may be used, and therefore the S-connected configuration could be more than twice the low charging voltage, as will be appreciated. The disclosed battery system is also capable of independently powering multiple drive systems aboard a mobile platform, e.g., front and rear wheel drive systems, and also of rapidly charging using either of the low or high charging voltages depending upon the configuration of the DCFC station.

In an exemplary embodiment, the mobile platform includes a controller, a reconfigurable battery system, and electric powertrain, and first and second charge ports. The battery system includes first and second battery packs, as well as first, second, and third switches having respective ON/OFF conductive states. The ON/OFF conductive states are individually commanded by the controller to selectively connect the first and second battery packs in either a parallel-connected (P-connected) configuration or a series-connected (S-connected) configuration based on a desired operating mode. The first and second charge ports are each connectable to the DCFC station via a corresponding charging cable during a DCFC event in which the first and/or second battery pack recharges via the DCFC station. The first charge port is configured to receive a low charging voltage or a high charging voltage from the DCFC station. The second charge port is configured to receive a low charging voltage that is less than half of the high charging voltage. The controller is configured, when the DCFC station is able to supply the high charging voltage to the first charge port, to selectively establish the S-connected configuration via control of the respective ON/OFF conductive states of the switches, and to thereafter charge the reconfigurable battery system solely via the first charge port.

The controller may be configured, when the DCFC station is able to supply the low charging voltage to the first charge port and the second charge port, to selectively establish the S-connected configuration via control of the respective ON/OFF conductive states of the switches, and to thereafter charge the reconfigurable battery system via the first charge port and the second charge port.

The controller may also record a diagnostic error code when the DCFC station is not able to supply the high charging voltage and is not able to supply the low charging voltage to the first charge port.

In some disclosed configurations of the controller, when the DCFC station is able to supply the low charging voltage only to the first charge port, the controller is operable for establishing the P-connected configuration via control of the respective ON/OFF conductive states of the switches, and for thereafter sequentially charging the first and second battery packs via the first charge port using the low charging voltage.

An accessory load may be connected to the second charge port during the DCFC event. During the DCFC event, the controller may power the accessory load at the low charging voltage via the second charge port concurrently with charging the reconfigurable battery system at the high charging voltage via the first charge port.

An optional fourth switch may be disposed between the second battery pack and the second charge port. The controller may selectively control the ON/OFF conductive state of the fourth switch to enable the second charge port to receive the high charging voltage from the DCFC station.

First and second power inverter modules may be connected to the reconfigurable battery system. A first electric machine may be connected to the first power inverter modules and configured to power front road wheels, and a second electric machine may be connected to the second power inverter modules and configured to power the rear road wheels. Or, a single power inverter module may be connected to the reconfigurable battery system, with a plurality of electric machines each respectively connected to the single power inverter module.

A method is also disclosed for charging a reconfigurable battery system of an electrical system having first and second battery packs using a DCFC station. The method may include verifying, via the above-noted controller, a connection of first and second charging cables from the DCFC station with respective first and second charge ports of the electrical system. The first charge port is configured to receive either of a low charging voltage or a high charging voltage from the DCFC station, and the second charge port is configured to receive a low charging voltage that is less than half of the high charging voltage.

The method may include selectively establishing an S-connected configuration of the first and second battery packs, via the controller, by individually commanding respective ON/OFF conductive states of first, second, and third switches of the reconfigurable battery system, and charging the reconfigurable battery system solely via the first charge port when the DCFC station supplies the high charging voltage to the first charge port.

Also disclosed herein is a motor vehicle. An exemplary embodiment of such a motor vehicle includes a controller, road wheels connected to a vehicle body, a rotary electric machine connected to the road wheels, and a power inverter module connected to the above-described battery system.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

BRIEF DESCRIPTION OF THE DRAWINGS

FIGS. 5 and 6 are flow charts depicting possible embodiments of a fast-charging method using the battery systems of FIGS. 2A and 2B, respectively.

FIG. 7 is a table of operating modes and corresponding switching states for the depicted battery systems.

Figure 1:
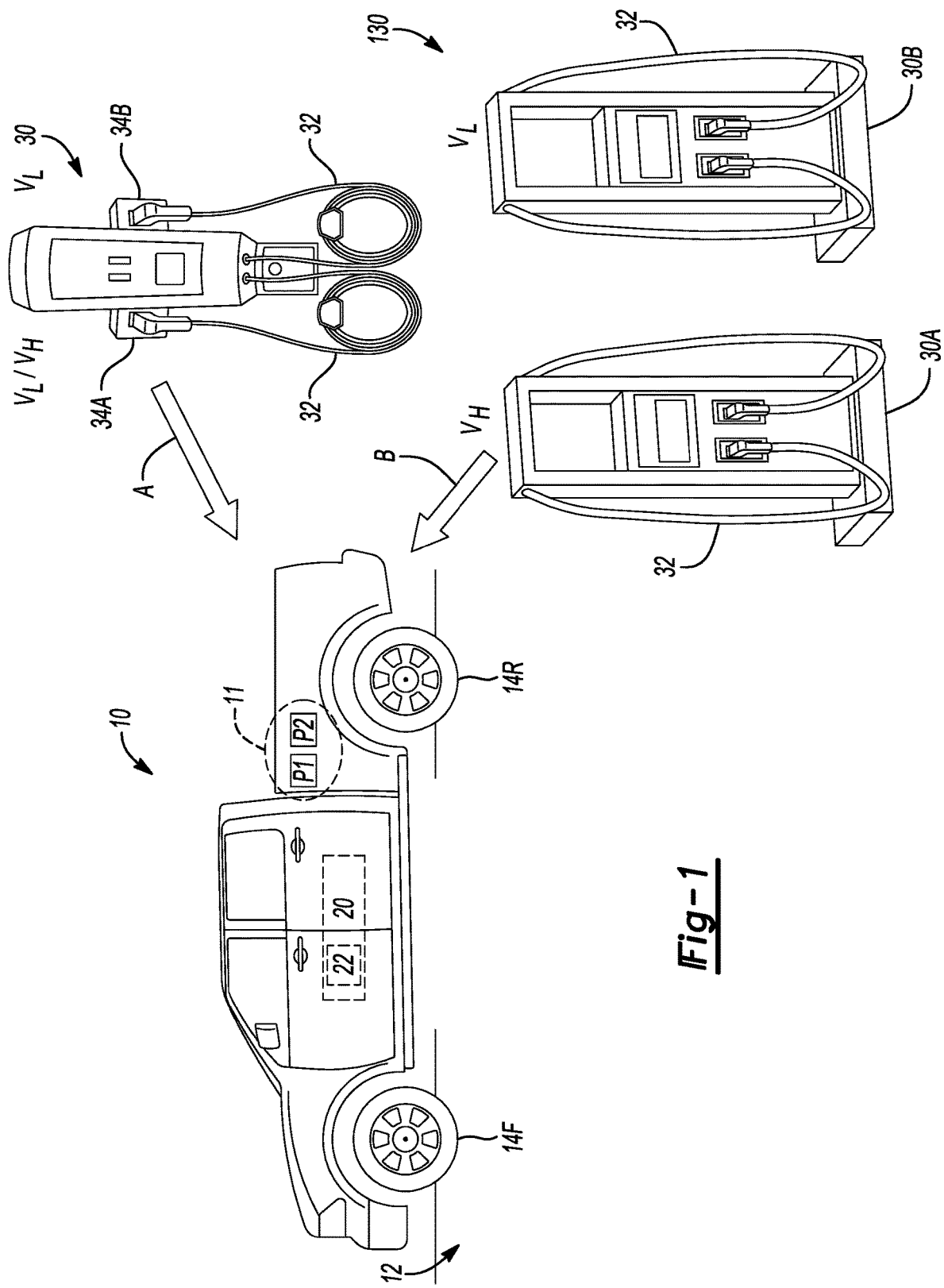
FIG. 1 is a schematic illustration of an exemplary mobile platform undergoing a direct current fast-charging (DCFC) operation, with the mobile platform equipped with dual charge ports, an electric powertrain, and a reconfigurable battery system as set forth herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, a mobile platform 10 having an electric powertrain 20 is depicted schematically in FIG. 1 in the form of an exemplary motor vehicle. In the illustrated embodiment, the mobile platform 10 is a passenger vehicle having respective front and rear road wheels 14F and 14R in rolling contact with a road surface 12. However, the described solutions may also be used in a wide range of rechargeable electrical systems, such as but not limited to power plants, robots, conveyors, and transport platforms. When the electric powertrain 20 is used in a vehicular application, the present teachings may be readily extended to various types of motor vehicles, aircraft, marine vessels, and trains, trams, subways, or other types of rail vehicles. For illustrative consistency, the mobile platform 10 of FIG. 1 will be described hereinafter in the context of a motor vehicle without limiting the present teachings.

The mobile platform 10 of FIG. 1 is depicted undergoing a direct current fast-charging (DCFC) operation in which a reconfigurable battery system 22 (see FIGS. 2A and 2B) of the electric powertrain 20 is electrically charged via an off-board DCFC station 30 (arrow A) or 130 (arrow B). Such a connection is made between the DCFC station 30 or 130 and dual charge ports 11 of the mobile platform 10, i.e., respective first and second charge ports P1 and P2, via a length of high-voltage charging cable 32. Charging plugs 34A and 34B forming end connections of the charging cable 32 may be configured as an SAE J1772 or other suitable country-specific or application-specific charge coupler or plug, as will be appreciated by those of ordinary skill in the art, and engaged with a respective one of the dual charge ports 11.

A designated one of the dual charge ports 11 may be configured as a main/primary charge port capable of receiving either a high charging voltage ($V_H$) or a low charging voltage ($V_L$) from the DCFC station 30 or 130. The other of the dual charge ports 11 may be configured as a secondary port capable of receiving only the low charging voltage ($V_L$) in certain disclosed embodiments. In a possible dual-voltage embodiment of the DCFC station 30, for instance, the charging plug 34A may output either of the low or high charging voltages $V_L$ or $V_H$, with such a dual-voltage capability indicated in FIG. 1 by the abbreviation "$V_L/V_H$". The charging plug 34B may output the low charging voltage ($V_L$) in the illustrated embodiment.

Figure 3:
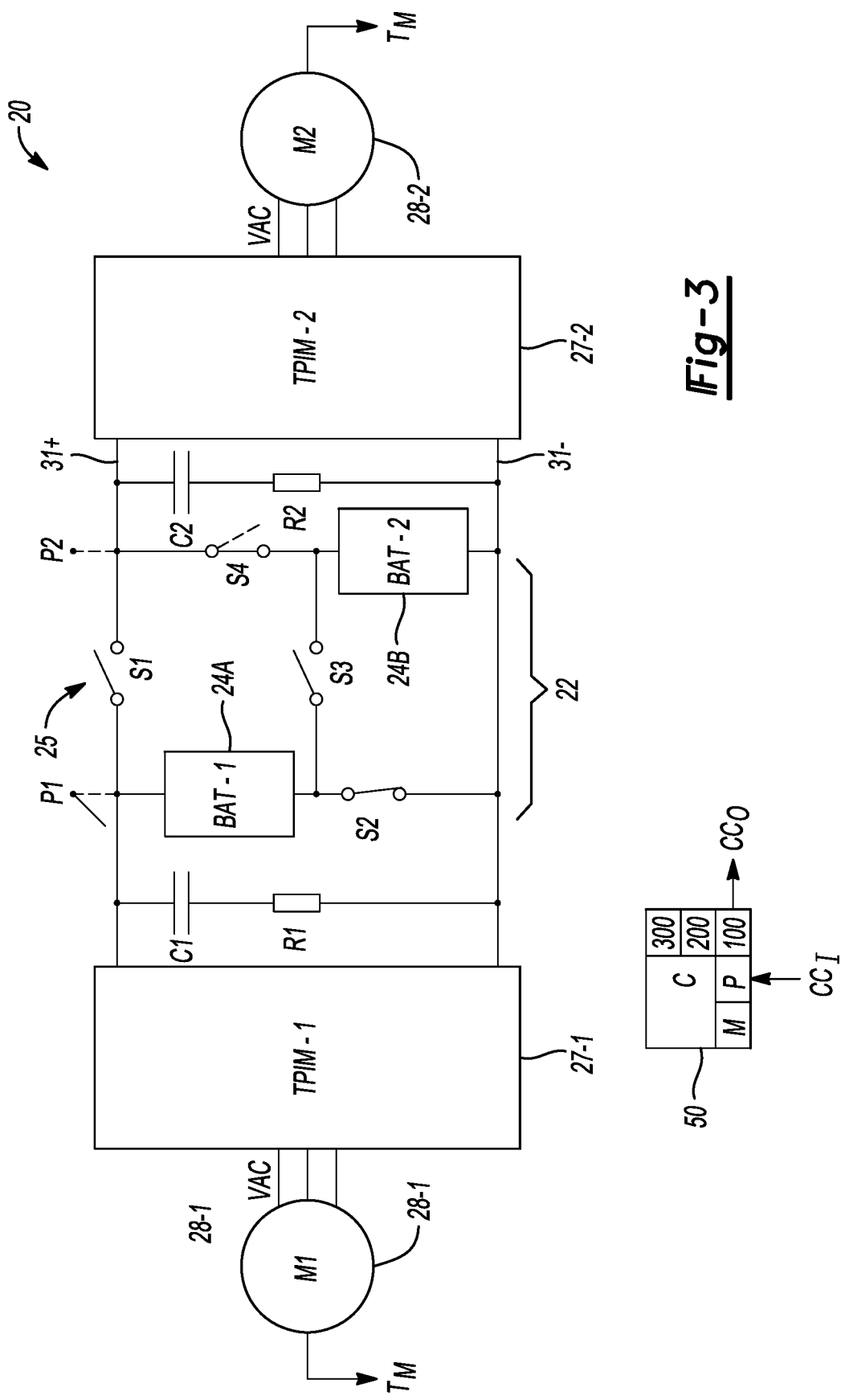
FIGS. 3 and 4 are schematic illustrations of possible embodiments of an electric powertrain that may include the battery systems of FIGS. 2A and 2B.

A DCFC event commences with connection of the charging plugs 34A and 34B to the respective first and second charge ports P1 and P2, and subsequent detection and verification of such connection by an onboard controller (C) 50 (see FIG. 3). Alternatively, the DCFC station 130 may include a DCFC station 30A capable of outputting the high charging voltage $V_H$ and a DCFC station 30B capable of outputting the low charging voltage $V_L$.

Figure 2A:
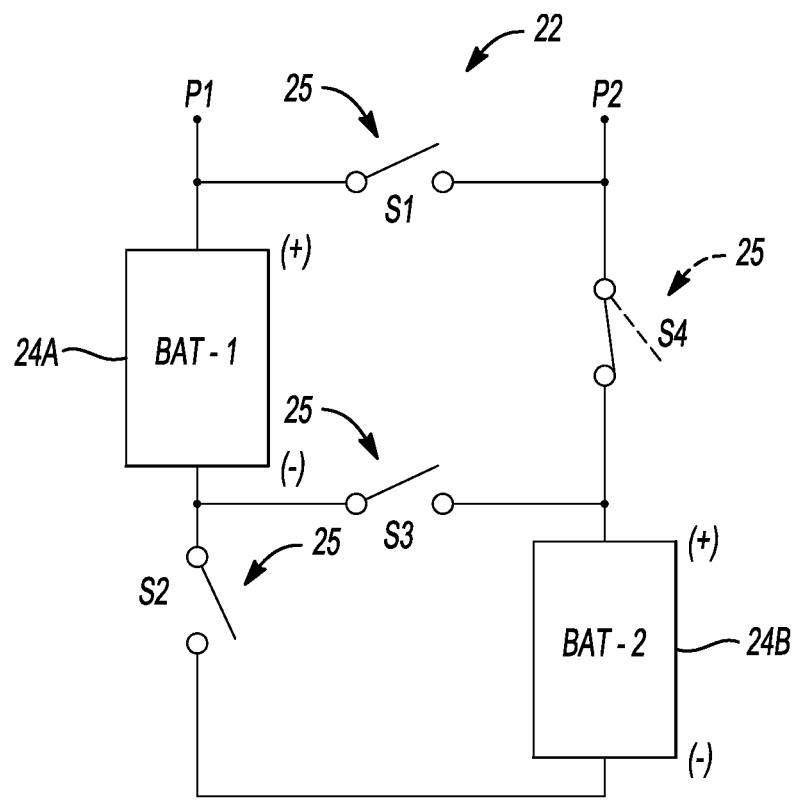
FIGS. 2A and 2B are schematic illustrations of different battery systems usable as part of the representative mobile platform of FIG. 1.
Figure 2B:
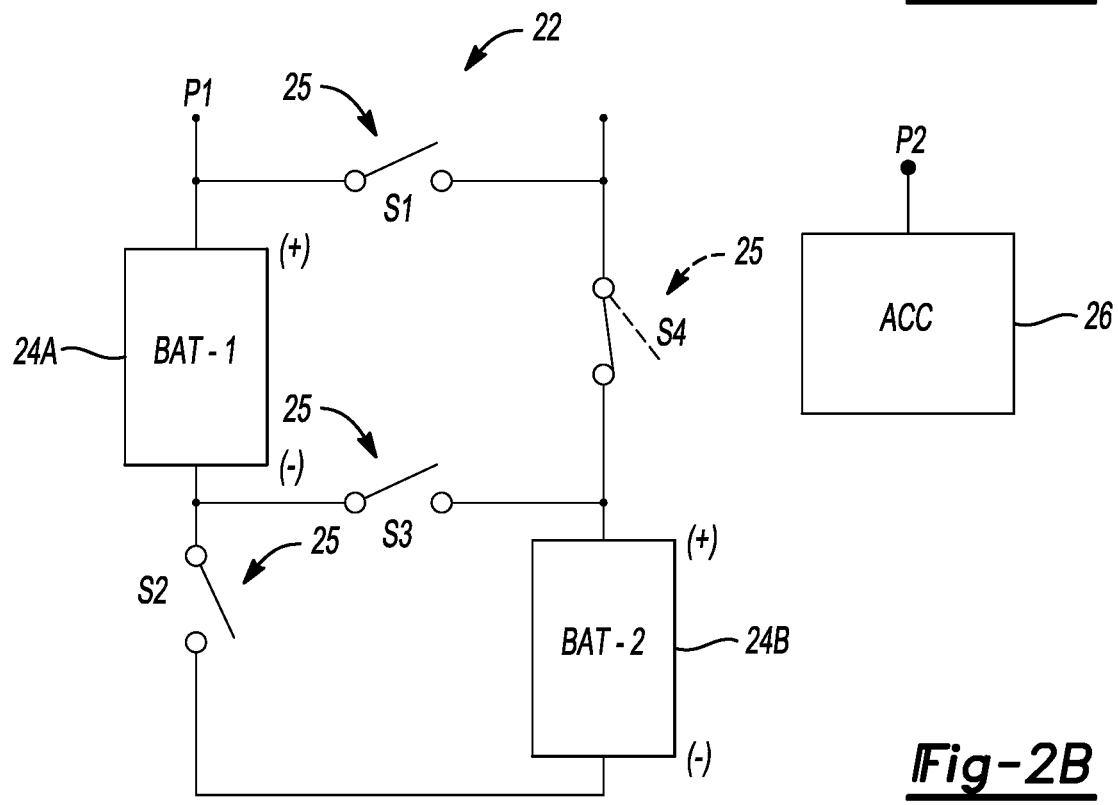

Referring to FIGS. 2A and 2B, the battery system 22 may be used as a constituent part of the above-noted electric powertrain 20 of FIG. 1. A simplified embodiment of the battery system 22 includes respective first and second battery packs 24A and 24B, i.e., BAT-1 and BAT-2. Battery packs 24A and 24B may each be embodied as multi-cell high-energy energy storage devices constructed from a lithium ion, zinc-air, nickel-metal hydride, or another application-suitable battery chemistry. The internal and external hardware configurations of the battery packs 24A and 24B may vary with the intended application. Although such hardware is omitted for illustrative simplicity, a representative configuration may arrange stacks of foil pouch-style battery cells within a rigid battery case, with the individual cells connected together via conductive bus bars. Cell voltages, temperatures, and other control values are read via a cell sense circuit mounted to such a battery case, with the control values relayed to a battery controller for use in controlling power flow to and from the battery system 22.

The first and second battery packs 24A and 24B shown schematically in FIGS. 2A and 2B are respectively connected to the first and second charge ports P1 and P2 via a set of switches 25. The switches 25 include at least first, second, and third switches S1, S2, and S3. An optional fourth switch S4 is included in some embodiments to enable use of the first or charge port P1 or P2 as the above-noted main or primary charge port capable of receiving the high charging voltage ($V_H$). The switches 25, which are shown as simplified ON/OFF binary switches for simplicity, may be variously embodied as mechanical switches or as solid-state semi-conductor switches, e.g., IGBTs or MOSFETS. Such switches 25 are responsive to ON/OFF state control signals (arrow $CC_I$ of FIG. 3), and thus opened (non-conducting) or closed (conducting) as needed based on pulse width modulation or other suitable switching control commands made by the controller 50 of FIG. 3 or a separate control unit.

In the illustrated embodiment of FIGS. 2A and 2B, the first charge port P1 is electrically connected to the positive terminal (+) of the first battery pack 24A. The second charge port P2 is connected in a similar manner to the positive terminal of the second battery pack 24B. The first switch S1 selectively interconnects the respective first and second charge ports P1 and P2. Negative terminals (−) of battery packs 24A and 24B are connected via the second switch S2, with the negative terminal of the first battery pack 24B connected to the positive terminal of the second battery pack 24B via the third switch S3. The optional fourth switch S4, which is controlled via a method 300 as set forth in FIG. 8, connects the positive terminal of the second battery pack 24B to the second charge port P2 to enable use of either charge port P1 or P2 as the main/high-voltage port.

The representative circuit topology of FIG. 2A allows high-voltage fast charging to occur via the first charge port P1. Such charging is enabled when respective first and second switches S1 and S2 are opened and the third switch S3 is closed. Alternatively, the first and second charge ports P1 and P2 may receive the low charging voltage ($V_L$) as noted above. For dual port/low-voltage charging, the first and third switches S1 and S3 are commanded open and the second switch S2 is commanded closed. Likewise, single-port charging is enabled via the first charge port P1 to initially charge the first battery pack 24A, which may be performed by opening the first and third switches S1 and S3 and closing the second switch S2. Thereafter, the second battery pack 24B may be charged by opening the second and third switches S2 and S3 and closing the first switch S1. These and other switching states are also summarized in FIG. 7. As an alternative for single-port charging, both battery packs 24A and 24B may be charged simultaneously in a P-connected configuration, with switches S1 and S2 closed and switch S3 open.

Alternatively, the circuit topology of FIG. 2B may be used to connect an optional accessory load (ACC) 26 to the second charge port P2 during a DCFC event in which the first charge port P1 is used to charge the multi-pack battery system 22. That is, using the dual charging ports 11 of FIG. 1, the first charge port P1 may be used to charge one or both of the battery packs 24A and/or 24B depending on the present charge mode, while the second charge port P2 is used to supply power directly to the connected accessory load 26 at the level of the low charging voltage $V_L$. Such a load may be variously embodied as an air conditioning compressor, a heater, a pump, or another accessory that an operator of the mobile platform 10 of FIG. 1 may wish to operate concurrently with ongoing charging of the respective first or second battery pack(s) 24A or 24B. Under extreme cold or hot weather conditions, where the battery packs 24A and 24B cannot be charged due to potential exposure to lithium plating or battery aging, the ACC 26 can take power directly from the DCFC station 30 or 130 to warm up or cool down the battery packs and vehicle cabin. After the battery temperature reaches a desired charging temperature through pre-heating or cooling, then the first charge port P1 is used to charge the battery packs 24A and/or 24B.

Figure 4:
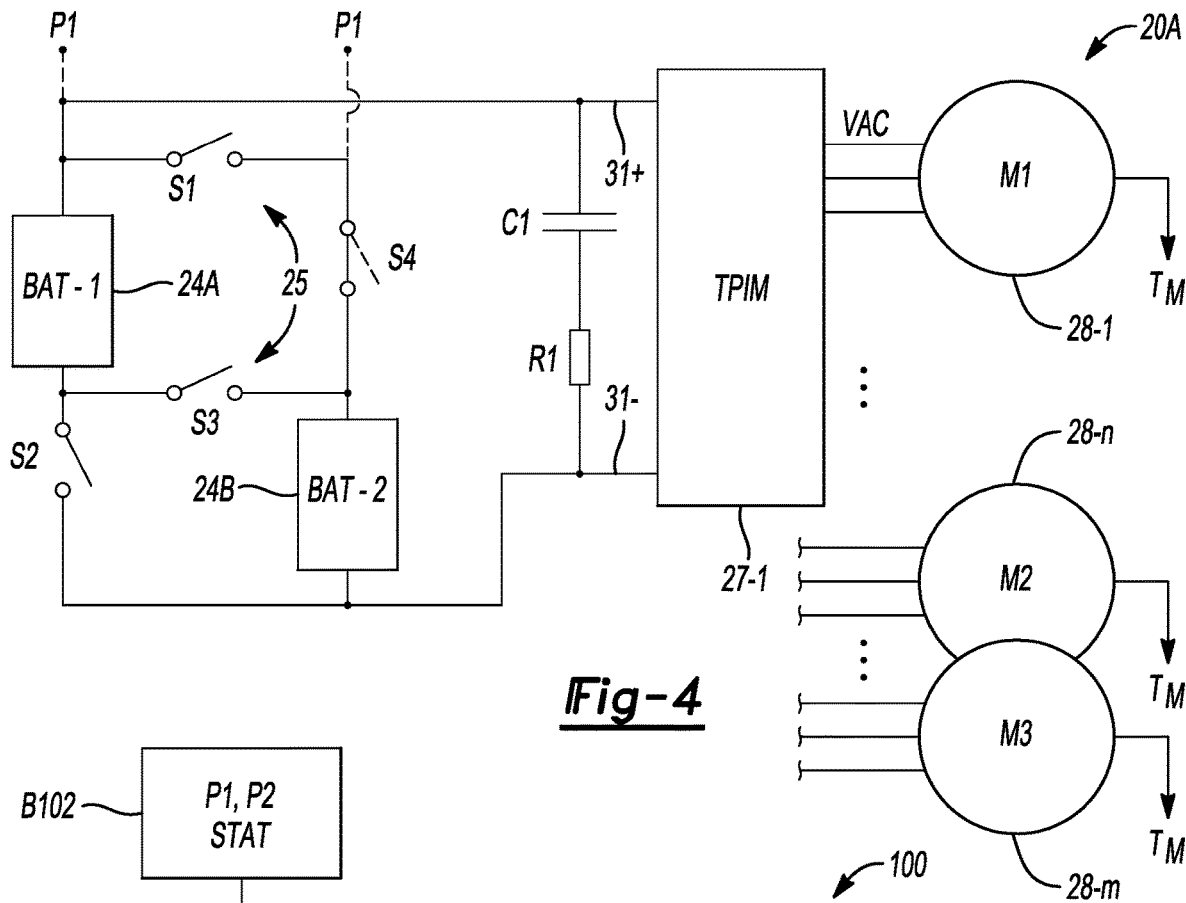

Referring to FIGS. 3 and 4, the battery system 22 of FIGS. 2A and 2B may be used as a constituent part of the electric powertrain 20, e.g., of a motor vehicle or another mobile platform 10. Power flow to and from the battery system 22 is provided via programmed operation the controller 50. In a simplified embodiment of the electric powertrain 20, the battery system 22 may be disposed between separate first and second traction power inverter modules 27-1 and 27-2, which are connected to positive and negative bus rails $31^+$ and $31^-$. For clarity, the traction power inverter modules 27-1 and 27-2 are respectively labeled TPIM-1 and TPIM-2. A respective link capacitor C1 and C2 and resistor R1 and R2 are connected in parallel with the TPIMs 27-1 and 27-2.

Each of the TPIMs 27-1 and 27-2 energizes a respective rotary electric machine 28-1 and 28-2 with an alternating current voltage (VAC), with the electric machines 28-1 and 28-2 respectively labeled M1 and M2. Motor torque (arrow $T_M$) from the electric machines 28-1 and 28-2 is then directed to a connected load, e.g., a transmission (not shown) and/or the road wheels 14F and 14R of FIG. 1. The architecture of FIG. 3 may also provide added flexibility by enabling battery packs 24A and 24B of different configurations, voltage capabilities, and/or battery chemistries to be used in different drive systems. For example, the battery pack 24B may power the road wheels 14R via the electric machine 28-2, while the battery pack 24A may independently power the road wheels 14F via the electric machine 28-1.

As part of the electric powertrain 20 shown in FIGS. 3 and 4, the controller 50 is equipped with a processor (P) and memory (M), with the memory (M) including application-suitable amounts of tangible, non-transitory memory, e.g., read only memory, whether optical, magnetic, flash, or otherwise. The controller 50 also includes application-sufficient amounts of random-access memory, electrically-erasable programmable read only memory, and the like, as well as a high-speed clock, analog-to-digital and digital-to-analog circuitry, and input/output circuitry and devices, as well as appropriate signal conditioning and buffer circuitry.

The controller 50 is programmed to execute instructions embodying the methods 100, 200, and 300 as set forth below, with the controller 50 controlling the ON/OFF states of the various switches 25 of FIGS. 2A and 2B as part of such methods. To that end, the controller 50 is configured to receive input signals (arrow $CC_I$) indicative of a drive-requested or autonomously-requested operating mode of the first and/or second battery packs 24A and/or 24B, and in response to such a requested mode, to output control signals (arrow $CC_O$) to the multi-pack battery system 22 and thereby establish a particular combination of switching states of the switches 25.

Some of the input signals (arrow $CC_I$) may be determined during a DCFC event during ongoing wired and/or wireless communication between the controller 50 and the DCFC station 30 or 130 of FIG. 1, as will be appreciated by those of ordinary skill in the art. Such communication generally occurs upon connection of the mobile platform 10 to the DCFC station 30 or 130, such as when the DCFC station 30 or 130 communicates its maximum charging voltage to the controller 50, and when the controller 50 provides information about the current state of charge, voltage capacity, chemistry, and other battery information to the DCFC station 30 or 130.

In a drive/propulsion mode, an operator-requested or autonomously-determined propulsion request may likewise cause the controller 50 to selectively establish a parallel-connected (P-connected) configuration of the respective first and second battery packs 24A and 24B. During certain DCFC events, the controller 50 may selectively reconfigure the first and second battery packs 24A and 24B to a series-connected (S-connected) configuration to take advantage of an available high charging voltage $V_H$. Depending on the particular configuration of the electric powertrain 20, propulsion of the mobile platform 10 in the S-connected configuration at the high charging voltage $V_H$ may be a possible operating mode.

The electric powertrain 20A of FIG. 4 depicts an alternative configuration to the electric powertrain 20 shown in FIG. 3 in which a single inverter such as TPIM 27-1 is used to power multiple electric machines 28-1, . . . , 28-n, . . . , 28-m (M1, . . . , M2, . . . M3) sharing the same voltage bus. Such an embodiment, with respective first and second switches S1 and S2 open and third switch S3 closed, may run the TPIM 27-1 at the higher voltage level $V_H$. For operation at the low charging voltage $V_L$, which occurs in the P-connected configuration, the respective first and second switches S1 and S2 are commanded closed and the third switch S3 is commanded open. The various electric machines 28-1, . . . 28-n, . . . 28-m may be used to power different loads, such as individual front or rear road wheels 14F or 14R of the exemplary mobile platform 10 of FIG. 1 or other devices aboard the mobile platform 10.

Figure 5:
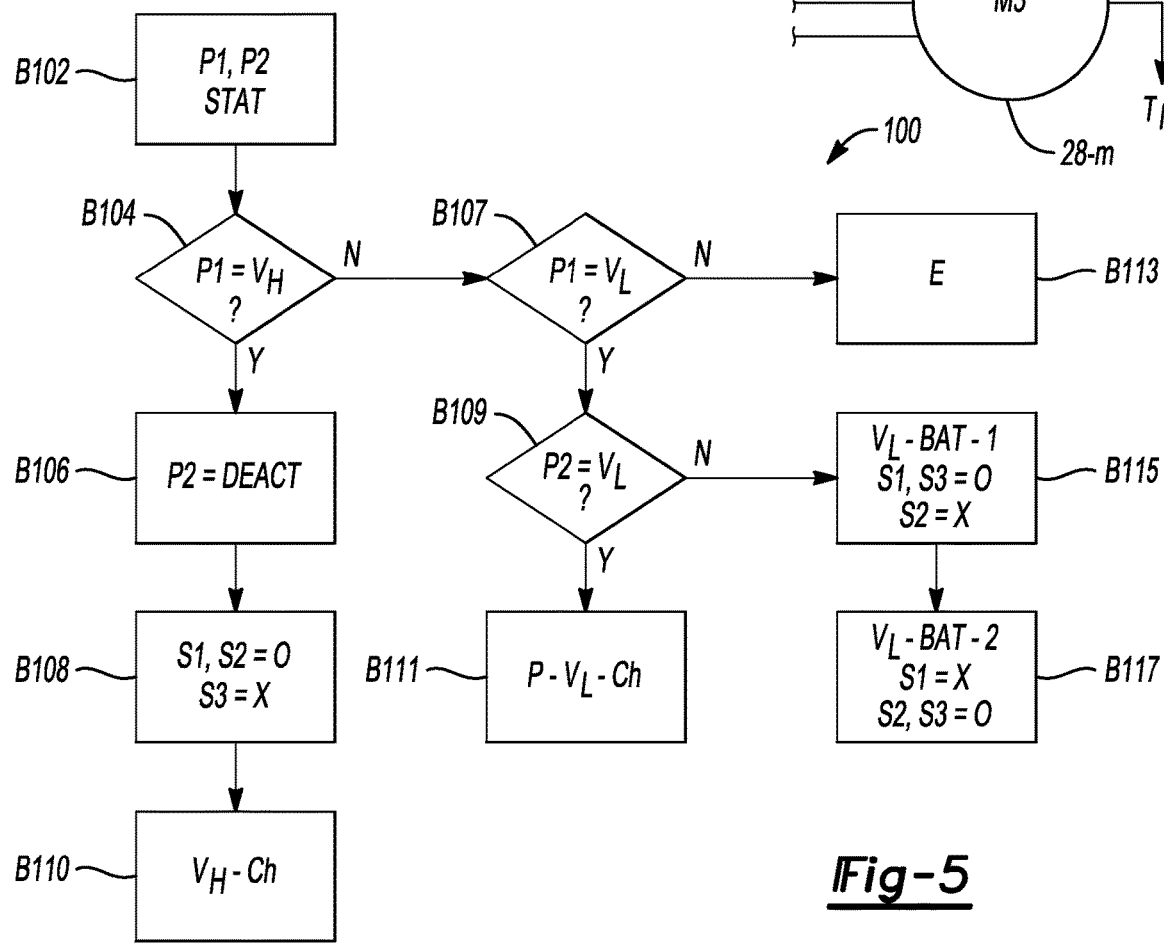

Referring to FIG. 5, the battery system 22 described above with reference to FIGS. 2A-4 may be controlled via the controller 50 according to a method 100. As with the methods 200 and 300 described below, the method 100 may be embodied as computer-executable instructions recorded in memory (M) of the controller 50 and executed by the processor (P). A corresponding logic table is shown in FIG. 7 depicting the ON/OFF switching states of the switches 25 and the resulting operating modes.

In an exemplary embodiment of the method 100 commencing with block B102, the controller 50 verifies connection of the charging plugs 34A and 34B from the DCFC station 30 or 130 (see FIG. 1) with the respective first and second charge ports P1 and P2. The controller 50 thereafter verifies the status or charge capability of the first and second charge ports P1 and P2 (P1, P2 STAT) upon such a connection. Verification in block B102 may occur automatically via an electronic handshake and a subsequent exchange of charging needs and capabilities information between the controller 50 and the DCFC station 30 or 130 of FIG. 1, as will be readily appreciated by those of ordinary skill in the art. An actual physical connection and communications protocol used for subsequent information exchange is dependent upon the relevant charging standard being employed. The result of block B102 is knowledge by the controller 50 of the maximum charging voltage that can be supplied to the first and charge ports P1 and P2 by the DCFC charge station 30 or 130. The method 100 proceeds to block B104.

At block B104, the controller 50 next determines whether the first charge port P1 is configured to receive the high charging voltage $V_H$, i.e., whether the DCFC station is able to supply the high charging voltage $V_H$ to the first charge port P1 (P1=$V_H$?). The method 100 proceeds to block B106 when the first charge port P1 is connected to receive the high charging voltage $V_H$, with the method 100 otherwise proceeding to block B107.

Block B106 of method 100, which is used when an accessory load 26 (FIG. 2B) is not concurrently powered during a DCFC event, may entail temporarily deactivating the second charge port P2 (P2=DEACT) via the controller 50. That is, with the first charge port P1 configured and connected to receive the high charging voltage $V_H$, the second charge port P2 is not required during the imminent DCFC event. Deactivation of the second charge port P2 may include preventing a flow of electrical power to the second charge port P2, such as by instructing the DCFC station 30 or 130 that the second charge port P2 is not available for charging, and/or unplugging or otherwise disconnecting the second charge port P2 from the DCFC station 30 or 130, etc. The method 100 thereafter proceeds to block B108.

Block B107, which is analogous to block B106, includes determining whether the first charge port P1 is instead configured and connected to receive the low charging voltage $V_L$ from the DCFC station 30 or 130 of FIG. 1 (P1=$V_L$?) The method 100 proceeds to block B109 when this is the case, with the method 100 otherwise continuing on with block B113 in the event the first charge port P1 is not configured to receive the low charging voltage $V_L$.

At block B108, the controller 50 establishes the S-connected configuration of the battery system 22. For example, the controller 50 may command the respective first and second switches S1 and S2 to open, and the third switch S3 to close ($S_1$, $S_2$=O, $S_3$=X), where "O" and "X" indicate respective open and closed states. The method 100 then proceeds to block B110.

At block B109, the controller 50 determines whether the second charge port P2 is configured and connected to receive the low charging voltage $V_L$ (P2=$V_L$?). If so, the method 100 proceeds to block B111, with the method 100 otherwise continuing with block B115 when the second charge port P2 is not configured to receive the low charging voltage $V_L$.

At block B110, the controller 50 commences a DCFC event at the high charging voltage $V_H$, with power flow to the battery system 22 occurring through the first charge port P1. The method 100 is then complete, resuming anew with block B102.

At block B111, the controller 50 initiates double-port fast charging (P-$V_L$-Ch) of the battery system 22 at the low charging voltage $V_L$ via the first and second charge ports P1 and P2. In order to do this, the controller 50 commands the respective first and third switches S1 and S3 to open and the second switch S2 to close, with such a state also depicted in FIG. 7.

Block B113 is reached from block B107 when the first charge port P1 is not configured to receive the high or low charging voltage $V_H$ or $V_L$. As this does not ordinarily occur, such a result may be treated by the controller 50 as an error state (E). Block B113 may include, responsive to the error state, interrupting power flow to the battery system 22 and unplugging from the DCFC station 30 or 130. Block B113 may also include recording a diagnostic error code in memory (M) of the controller 50 that is indicative of the error state. The method 100 is complete, thereafter resuming with block B102 after taking necessary corrective action to address or clear the anomaly.

At block B115, the controller 50 opens the respective first and third switches S1 and S3 and closes the second switch S2 (S1, S3=O, S2=X). Once the indicated switching states are established, the controller 50 commences charging of the first battery pack 24A ($V_L$-BAT-1). The method 100 proceeds to block B117 once the first battery pack 24A has fully charged.

Block B117 is analogous to block B115 and includes charging the second battery pack 24B ($V_L$-BAT-2). Prior to charging the second battery pack 24B, the controller 50 commands the first switch S1 to close and the respective second and third switches S2 and S3 to open (S1=X, S2, S3=O). Thus, blocks B115 and B117 of method 100 together entail sequentially charging the first and second battery packs 24A and 24B, i.e., the first battery pack 24A is charged first, followed by the second battery pack 24B. The method 100 is then complete, resuming anew with block B102.

Referring to FIG. 6, the method 200 may be used as an alternative approach to the method 100 of FIG. 5 whenever the optional accessory load 26 of FIG. 2B is to be powered concurrently with a DCFC event. With the exception of block B211, the various logic blocks of method 200 are analogous to corresponding blocks of method 100, and thus are summarized below for simplicity.

At block B202, the controller 50 of FIG. 3 first verifies the status of the first and second charge ports P1 and P2 of the mobile platform 10 shown in FIG. 1. As part of block B202, the controller 50 may determine whether a human or autonomous operator of the mobile platform 10 of FIG. 1 has requested simultaneous powering of accessory load 26 of FIG. 2B. The controller 50 proceeds to block B204, where the controller 50 determines if the first charge port P1 is configured and connected to receive the high charging voltage $V_H$ from the DCFC station 30 or 130 (P1=$V_H$?). If so, the method 200 proceeds to block B209. The method 200 proceeds instead to block B205 whenever the first charge port P1 is not configured and connected to receive the high charging voltage $V_H$.

Block B205 entails determining, once again via operation of the controller 50 of FIG. 3, whether the first charge port P1 is configured and connected to receive the low charging voltage $V_L$ from the DCFC station 30 or 130 of FIG. 1 (P1=$V_L$?). The method 200 proceeds to block B206 when the first charge port P1 is so configured, and to block B213 in the alternative whenever the first charge port P1 is not configured to receive the low charging voltage $V_L$.

At block B206, the controller 50 opens the respective first and third switches S1 and S3 and closes the second switch S2. The controller 50 thereafter initiates fast-charging of the battery system 22 via the first charge port P1 (P1-$V_L$-Ch). Charging in this particular embodiment may occur at the low charging voltage $V_L$.

Block B209 entails determining via the controller 50 whether the second charge port P2 is configured and connected to receive the low charging voltage $V_L$. The method 200 proceeds to block B210 when the first and second charge ports P1 and P2 are both configured to receive the low charging voltage $V_L$ from the DCFC station 30 or 130, and to block B213 in the alternative when the second charge port P2 is not configured to receive the low charging voltage $V_L$.

The controller 50 simultaneously executes blocks B210 and B212. In block B210, the controller 50 opens the respective first and second switches S1 and S2 and closes the third switch S3. The method 200 proceeds to block B211 to conduct series/S-connected charging of the battery system 22 at the high charging voltage $V_H$, with such a charging mode abbreviated "$V_H$-Ch" in FIGS. 6 and 7.

Block B212 in this particular embodiment is reached from block B209, and entails directly powering the accessory load (ACC) 26 of FIG. 2B at the level of the low charging voltage $V_L$, with this occurring via the second charge port P2. For instance, an operator of the mobile platform 10 depicted in FIG. 1 may wish to run an air conditioning compressor or a blower motor to condition a passenger cabin of the mobile platform 10 during the ongoing fast-charging process, with such an accessory load 26 energized via the second charge port P2 in this particular embodiment.

Referring briefly to FIG. 7, six exemplary operating modes are listed in table form under a mode column (Md), with open (O) and closed (X) switching states of the various switches 25 shown in FIGS. 2A and 2B depicted for each mode. Mode 1 ($V_H$-Ch) is a series/S-connected charging mode occurring at the high charging voltage $V_H$, with the respective first and second switches S1 and S2 in an open state and the third switch S3 in a closed state. Mode 2 (P-$V_L$-Ch) is a parallel/P-connected charging mode conducted at the low charging voltage $V_L$, with respective first and third switches S1 and S3 open and the second switch S2 closed in this particular mode. Modes 3 and 4 correspond to individual charging of the first and second battery packs 24A and 24B, respectively, at the low charging voltage $V_L$.

Also depicted in FIG. 7 are two possible electric propulsion modes for the mobile platform 10 shown in FIG. 1, i.e., Modes 5 and 6. Mode 5 ($V_H$-S) is a series/S-connected propulsion mode conducted at the high charging voltage $V_H$. In such a mode, the respective first and second switches S1 and S2 are commanded open and the third switch S3 is commanded closed. Mode 6 ($V_L$-P) is a parallel/P-connected propulsion mode conducted at the low charging voltage $V_L$, i.e., with the first and second battery packs 24A and 24B connected in parallel. In Mode 6, the switching states of switches S1, S2, and S3 are opposite the corresponding switching states in Mode 5, i.e., first and second switches S1 and S2 are commanded closed by the controller 50 and the third switch S3 is commanded open.

As noted above and as shown in FIGS. 2A and 2B, the battery system 22 may optionally include the optional fourth switch S4. When used, switch S4 may be positioned between the second charge port P2 and the second battery pack 24B. Inclusion of the fourth switch S4 provides added control flexibility by allowing either of the first or second charge ports P1 or P2 to receive the high charging voltage $V_H$ from the DCFC station 30 or 130, as opposed to relying on the first charge port P1 for this purpose. Thus, the inclusion of the fourth switch S4, albeit at the cost of a slight increase in programming complexity, provides a greater amount of control freedom when charging the battery system 22 via the DCFC station 30 or 130 of FIG. 1.

Figure 8:
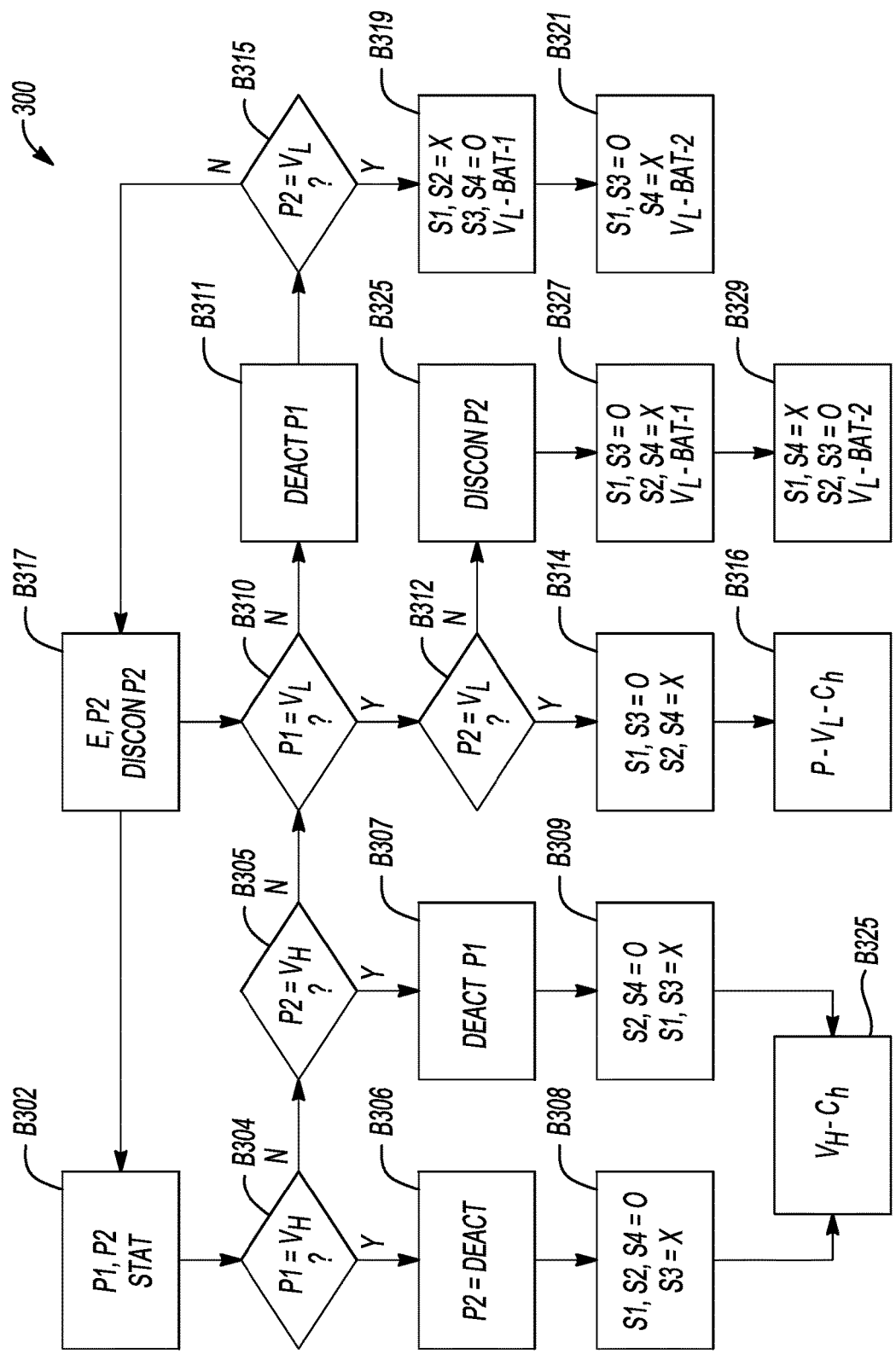
FIG. 8 is another flow chart depicting an exemplary embodiment of an alternative charging method using an additional switch as part of a battery system.

FIG. 8 is a flow chart for a method 300. Method 300 is adapted for use with either of the representative circuit topologies of FIGS. 2A and 2B whenever the optional fourth switch S4 is included. While some of the logic blocks of FIG. 8 are analogous to corresponding logic blocks of FIGS. 5 and 6, the flexibility of using either of the first or second charge ports P1 or P2 to receive the high charging voltage $V_H$ necessitates the use of additional logic flow decisions and possible control outputs of method 300.

In an exemplary embodiment of such a method 300, block B302 entails verifying the status of the respective first and second charge ports P1 and P2 and connection of the same to the DCFC station 30 or 130 of FIG. 1, e.g., automatically via an electronic handshake between the controller 50 and the DCFC station 30 or 130, as will be appreciated by those of ordinary skill in the art and noted above with reference to method 100. The method 300 then proceeds to block B304.

Block B304 includes using the controller 50 to determine whether the first charge port P1 is configured and connected to receive the high charging voltage $V_H$ from the DCFC station 30 or 130 (P1=\V). If such is the case, the method 300 proceeds to block B306, with the method 300 otherwise continuing on to block B305 when the first charge port P1 is not configured to receive the high charging voltage $V_H$.

At block B305, the controller 50 determines whether the second charge port P2 is configured and connected to receive the high charging voltage $V_H$ from the DCFC station 30 or 130 (P2=\V). If so, the method 300 proceeds to block B307, with the method 300 otherwise continuing on to block B310 when the second charge port P2 is not configured to receive the high charging voltage $V_H$.

Block B306 entails deactivating the second charge port P2 via the controller 50. That is, with the first charge port P1 configured to receive the high charging voltage $V_H$, the second charge port P2 is not needed in a subsequent charging action. The method 300 proceeds to block B308.

Block B307 may entail deactivating the first charge port P1 (DEACT P1) via the controller 50 before proceeding to block B309.

At block B308, the controller 50 opens the first, second, and fourth switches S1, S2, and S4 and closes the third switch S3. The controller 50 proceeds to block B325 once the indicated switching states have been established.

At block B309, the controller 50 opens the respective second and fourth switches S2 and S4 and closes the first and third switches S1 and S3. The controller 50 thereafter proceeds to block B325.

Block B310 includes determining whether the first charge port P1 is configured to receive a charging voltage from the DCFC station 30 or 130 of FIG. 1 at the low charging voltage $V_L$ (P1=$V_L$?) The method 300 proceeds to block B312 when this is the case, with the method 300 otherwise continuing with block B311.

Block B311 entails deactivating the first charge port P1 via the controller 50 (DEACT P1) before proceeding to block B315. As shown in FIG. 8, the controller 50 at block B315 determines whether the second charge port P2 is configured and connected to receive the low charging voltage $V_L$ from the DCFC station 30 or 130 (P2=$V_L$?), analogously to above-described block B305. If so, the method 300 proceeds to block B319, with the method 300 otherwise returning to block B317.

Block B312 includes determining whether the second charge port P2 is configured to receive the low charging voltage $V_L$ from the DCFC station 30 or 130 (P2=$V_L$?). If so, the method 300 proceeds to block B314, with the method 300 otherwise continuing on to block B325 when the second charge port P2 is not configured and connected to receive the low charging voltage $V_L$.

At block B314, the controller 50 opens the respective first and third switches S1 and S3 (S1, S3=O) and closes the respective second and fourth switches S2 and S4 (S2, S4=X). The controller 50 thereafter proceeds to block B316.

At block B316, the controller 50 next initiates dual-port fast charging of the battery system 22 in a parallel/P-connected configuration, which is abbreviated P-$V_L$-Ch in FIG. 8. The method 300 is complete, resuming anew with block B302.

At block B317, the controller 50 may record an error code corresponding to an error state of second charge port P2 (E, P2), and then may disconnect the second charge port P2 (DISCON P2). The method 300 thereafter returns to block B302.

Block B319 entails closing the respective first and second switches S1 and S2 (S1, S2=X) and opening the respective third and fourth switches S3 and S4 (S3, S4=O). The controller 50 thereafter charges the first battery pack 24A at the low charging voltage $V_L$, i.e., $V_L$-BAT-1. The method 300 then proceeds to block B321.

At block B321, the controller 50 opens the respective first and third switches S1 and S3 (S1, S3=O) and closes the respective second and fourth switches S2 and S4 (S2, S4—X). The controller 50 thereafter initiates charging of the second battery pack 24B at the low charging voltage $V_L$, i.e., $V_L$-BAT-2. The method 300 is then complete, resuming anew with block B302.

Block B325 includes unplugging or disconnecting charge port P2 (DISCON P2) and then proceeding to block B327.

Block B327 entails opening the respective first and third switches S1 and S3 (S1, S3=O) and closing the respective second and fourth switches S2 and S4 (S2, S4=X). The controller 50 thereafter initiates charging of the first battery pack 24A at the low charging voltage $V_L$, i.e., $V_L$-BAT-1, and then proceeds to block B329.

At block B329, the controller 50 closes the respective first and fourth switches S1 and S4 (S1, S4=X) and opens the respective second and third switches S2 and S3 (S2, S3=O). The controller 50 thereafter charges the second battery pack 24B at the low charging voltage $V_L$, i.e., $V_L$-BAT-2.

Although for clarity the methods 100, 200, and 300 are described separately above with reference to FIGS. 5, 6, and 8, respectively, the collective logic of the methods 100, 200, and 300 may be implemented as alternative loops of a single control algorithm or program. For instance, the controller 50 may be programmed with the number of switches 25 in the battery system 22, including whether the optional fourth switch S4 is used. The controller 50 is thus configured to determine whether or not an operator or autonomous logic has requested that the accessory load 26 of FIG. 2B remain powered during a particular charging operation of the battery system 22. Using such information, the controller 50 may then determine the particular control logic subroutine to implement.

The above disclosure therefore provides a flexible dual-port charging architecture for achieving maximum power charging of the battery system 22 used aboard the mobile platform 10 of FIG. 1. Charging may occur using the low and/or high charging voltages $V_L$ or $V_H$, respectively, and using either of the DCFC stations 30 or 130. Additionally, the disclosed solutions provide added flexibility to use the separate first and second battery packs 24A and 24B to power independent drive systems. By using the described first and second charge ports P1 and P2 on the mobile platform 10, one charge port P1 or P2 may be used to support the accessory load 26 of FIG. 2B while the other charge port P2 or P1 receives a charging voltage for recharging the individual cells of the battery system 22. These and other advantages will be readily appreciated by those of ordinary skill in the art in view of the foregoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A system for use with a direct current fast-charging (DCFC) station, the system comprising:
    a controller;
    a reconfigurable battery system that includes:
        first and second battery packs;
        first, second, and third switches having respective ON/OFF conductive states that are individually commanded by the controller to selectively connect the first and second battery packs in either a parallel-connected (P-connected) configuration or a series-connected (S-connected) configuration based on a desired operating mode;
    an electric powertrain having one or more electric machines powered via the reconfigurable battery system; and
    first and second charge ports each being connectable to the DCFC station via a corresponding charging cable during a DCFC event in which the first and/or second battery pack of the reconfigurable battery system is recharged via the DCFC station, wherein the first charge port is configured to receive a low charging voltage or a high charging voltage from the DCFC station, and the second charge port is configured to receive a low charging voltage that is less than half of the high charging voltage;
    wherein the controller is configured, when the DCFC station is able to supply the high charging voltage to the first charge port, to selectively establish the S-connected configuration via control of the respective ON/OFF conductive states of the switches, and to thereafter charge the reconfigurable battery system solely via the first charge port.

2. The system of claim 1, wherein the controller is configured, when the DCFC station is able to supply the low charging voltage to the first charge port and the second charge port, to selectively establish the S-connected configuration via control of the respective ON/OFF conductive states of the switches, and to thereafter charge the reconfigurable battery system via the first charge port and the second charge port.

3. The system of claim 1, wherein the controller is configured to record a diagnostic error code when the DCFC station is not able to supply the high charging voltage and is not able to supply the low charging voltage to the first charge port.

4. The system of claim 1, wherein the controller is configured, when the DCFC station is able to supply the low charging voltage only to the first charge port, to establish the P-connected configuration via control of the respective ON/OFF conductive states of the switches, and to thereafter sequentially charge the first battery pack and the second battery pack via the first charge port using the low charging voltage.

5. The system of claim 1, further comprising an accessory load connected to the second charge port during the DCFC event, wherein during the DCFC event the controller is configured to power the accessory load at the low charging voltage via the second charge port concurrently with charging the reconfigurable battery system at the high charging voltage via the first charge port.

6. The system of claim 1, further comprising a fourth switch disposed between the second battery pack and the second charge port, wherein the controller is configured to selectively control the ON/OFF conductive state of the fourth switch to enable the second charge port to receive the high charging voltage from the DCFC station.

7. The system of claim 1, further comprising:
    a vehicle body;
    road wheels connected to the vehicle body, wherein the road wheels are in rolling contact with a road surface; and
    one or more electric machines configured to power the road wheels.

8. The system of claim 7, further comprising first and second power inverter modules connected to the reconfigurable battery system, wherein the road wheels include front and rear road wheels, and wherein the one or more electric machines includes a first electric machine connected to the first power inverter modules and configured to power the front road wheels, and a second electric machine connected to the second power inverter modules and configured to power the rear road wheels.

9. The system of claim 7, further comprising a single power inverter module connected to the reconfigurable battery system, wherein the road wheels include front and rear road wheels, and wherein the one or more electric machines includes a plurality of electric machines each connected to the single power inverter module.

10. A method for charging a reconfigurable battery system of an electrical system having a first battery pack and a second battery pack using a direct current fast-charging (DCFC) station, the method comprising:
    verifying, via a controller, a connection of first and second charging cables from the DCFC station with respective first and second charge ports of the electrical system, wherein the first charge port is configured to receive either of a low charging voltage or a high charging voltage from the DCFC station, and the second charge port is configured to receive a low charging voltage that is less than half of the high charging voltage;
    selectively establishing a series-connected (S-connected) configuration of the first and second battery packs, via the controller, by individually commanding respective ON/OFF conductive states of first, second, and third switches of the reconfigurable battery system; and
    charging the reconfigurable battery system solely via the first charge port when the DCFC station supplies the high charging voltage to the first charge port.

11. The method of claim 10, further comprising:
    charging the reconfigurable battery system via the controller, the first charge port, and the second charge port when the DCFC station is able to supply the low charging voltage to the first charge port and the second charge port.

12. The method of claim 10, further comprising:
recording a diagnostic error code via the controller when the DCFC station is not able to supply the high charging voltage to the first charge port, and is also not able to supply the low charging voltage to the first charge port.

13. The method of claim 10, further comprising:
when the DCFC station is able to supply the low charging voltage only to the first charge port, establishing a parallel-connected (P-connected) configuration of the first and second battery packs of the reconfigurable battery system via control of the respective ON/OFF conductive states of the switches; and
thereafter sequentially charging the first battery pack and the second battery pack via the first charge port using the low charging voltage.

14. The method of claim 10, wherein the electrical system includes an accessory load connected to the second charge port during the DCFC event, the method further comprising:
during the DCFC event, powering the accessory load at the low charging voltage via the second charge port concurrently with charging the reconfigurable battery system at the high charging voltage via the first charge port.

15. The method of claim 10, herein the electrical system includes a fourth switch disposed between the second battery pack and the second charge port, the method further comprising:
selectively controlling the ON/OFF conductive state of the fourth switch to enable the second charge port to receive the high charging voltage from the DCFC station; and
charging the reconfigurable battery system via the second port using the high charging voltage.

16. The method of claim 10, wherein the electrical system is part of a motor vehicle having road wheels connected to a vehicle body, the method further comprising:
energizing at least one rotary electric machine via the reconfigurable battery to thereby generate motor torque; and
transmitting the motor torque to the road wheels to thereby propel the motor vehicle.

17. The method of claim 16, wherein the road wheels include front and rear road wheels, and the at least one rotary electric machine includes first and second rotary electric machines connected to the reconfigurable battery system, the method further comprising:
energizing the first electric machine to generate a first motor torque;
energizing the second electric machine to generate a second motor torque;
transmitting the first motor torque to the front road wheels; and
transmitting the second motor torque to the rear road wheels.

18. A motor vehicle comprising:
a controller;
a vehicle body;
road wheels connected to the vehicle body, wherein the road wheels are in rolling contact with a road surface;
a rotary electric machine connected to the road wheels;
a power inverter module;
a reconfigurable battery system connected to the power inverter module, and including:
first and second battery packs;
first, second, and third switches having respective ON/OFF conductive states that are individually commanded by the controller to selectively connect the first and second battery packs in either a parallel-connected (P-connected) configuration or a series-connected (S-connected) configuration based on a desired operating mode;
an electric powertrain having one or more electric machines powered via the reconfigurable battery system; and
first and second charge ports each being connectable to the DCFC station via a corresponding charging cable during a DCFC event in which the first and/or second battery pack of the reconfigurable battery system is recharged via the DCFC station, wherein the first charge port is configured to receive a low charging voltage or a high charging voltage from the DCFC station, and the second charge port is configured to receive a low charging voltage that is less than half of the high charging voltage;
wherein the controller is configured:
when the DCFC station is able to supply the high charging voltage to the first charge port, to selectively establish the S-connected configuration via control of the respective ON/OFF conductive states of the switches, and to thereafter charge the reconfigurable battery system solely via the first charge port;
when the DCFC station is able to supply the low charging voltage to the first charge port and the second charge port, to selectively establish the S-connected configuration via control of the respective ON/OFF conductive states of the switches, and to thereafter charge the reconfigurable battery system via the first charge port and the second charge port; and
to record a diagnostic error code when the DCFC station is not able to supply the high charging voltage and is not able to supply the low charging voltage to the first charge port.

19. The motor vehicle of claim 18, wherein the controller is configured, when the DCFC station is able to supply the low charging voltage only to the first charge port, to establish the P-connected configuration via control of the respective ON/OFF conductive states of the switches, and to thereafter sequentially charge the first battery pack and the second battery pack via the first charge port using the low charging voltage.

20. The motor vehicle of claim 18, further comprising an accessory load connected to the second charge port during the DCFC event, wherein during the DCFC event the controller is configured to power the accessory load at the low charging voltage via the second charge port concurrently with charging the reconfigurable battery system at the high charging voltage via the first charge port.

* * * * *